United States Patent
Lai et al.

(10) Patent No.: US 11,394,973 B2
(45) Date of Patent: *Jul. 19, 2022

(54) SIGNALING OF QUANTIZATION MATRICES

(71) Applicant: MediaTek Inc., Hsinchu (TW)

(72) Inventors: Chen-Yen Lai, Hsinchu (TW); Olena Chubach, San Jose, CA (US); Tzu-Der Chuang, Hsinchu (TW); Ching-Yeh Chen, Hsinchu (TW); Chih-Wei Hsu, Hsinchu (TW); Yu-Wen Huang, Hsinchu (TW)

(73) Assignee: HFI Innovation Inc.

( * ) Notice: Subject to any disclaimer, the term of this patent is extended or adjusted under 35 U.S.C. 154(b) by 0 days.

This patent is subject to a terminal disclaimer.

(21) Appl. No.: 16/921,717

(22) Filed: Jul. 6, 2020

(65) Prior Publication Data
US 2021/0006795 A1 Jan. 7, 2021

Related U.S. Application Data

(60) Provisional application No. 62/900,703, filed on Sep. 16, 2019, provisional application No. 62/896,642, (Continued)

(51) Int. Cl.
*H04N 19/126* (2014.01)
*H04N 19/192* (2014.01)
*H04N 19/172* (2014.01)

(52) U.S. Cl.
CPC ......... *H04N 19/126* (2014.11); *H04N 19/172* (2014.11); *H04N 19/192* (2014.11)

(58) Field of Classification Search
CPC ... H04N 19/126; H04N 19/172; H04N 19/192
See application file for complete search history.

(56) References Cited

U.S. PATENT DOCUMENTS

| 5,596,376 A | 1/1997 | Howe |
|---|---|---|
| 2007/0189626 A1* | 8/2007 | Tanizawa ............. H04N 19/174 375/E7.199 |

(Continued)

FOREIGN PATENT DOCUMENTS

| CN | 101317463 A | 12/2008 |
|---|---|---|
| CN | 101401435 A | 4/2009 |

(Continued)

OTHER PUBLICATIONS

China National Intellectual Property Administration, International Search Report and Written Opinion for PCT/CN2020/100470, dated Sep. 29, 2020.

(Continued)

*Primary Examiner* — Hesham K Abouzahra
(74) *Attorney, Agent, or Firm* — Han IP PLLC; Andy M. Han

(57) ABSTRACT

A method for signaling scaling matrices for transform coefficient quantization is provided. A video decoder receives data from a bitstream to be decoded as a current picture of a video. The video decoder determines a plurality of scaling matrices that are used to code the current picture, wherein a first scaling matrix of the plurality of scaling matrices is determined by referencing a previously determined second scaling matrix of the plurality of scaling matrices. The video decoder dequantizes transform coefficients of transform blocks of the current picture by using the determined plurality of scaling matrices. The video decoder reconstructs the current picture by using the dequantized transform coefficients.

10 Claims, 14 Drawing Sheets

Related U.S. Application Data filed on Sep. 6, 2019, provisional application No. 62/871,124, filed on Jul. 6, 2019.

(56) References Cited

U.S. PATENT DOCUMENTS

| | | | |
|---|---|---|---|
| 2014/0050262 A1 | 2/2014 | Sakurai et al. | |
| 2015/0334396 A1* | 11/2015 | Lim | H04N 19/159 |
| | | | 375/240.03 |
| 2020/0252612 A1* | 8/2020 | Tanaka | H04N 19/31 |

FOREIGN PATENT DOCUMENTS

| | | |
|---|---|---|
| CN | 103503452 A | 1/2014 |
| CN | 107682706 A | 2/2018 |

OTHER PUBLICATIONS

Chubach et al., CE7-related: Support of quantization matrices for VVC JVET-N0847-v1, Joint Video Experts Team (JVET) of ITU-T SG 16 WP 3 and ISO/IEC JTC 1/SC 29/WG 11 14th Meeting, Geneva, Switzerland, Mar. 19-27, 2019.

* cited by examiner

FIG. 1

Default 4x4 Quant Matrix for Intra Luma, Intra Cb, Intra Cr, Inter Luma, InterCb, InterCr

| 16 | 16 | 16 | 16 |
|----|----|----|----|
| 16 | 16 | 16 | 16 |
| 16 | 16 | 16 | 16 |
| 16 | 16 | 16 | 16 |

Default 8x8 Quant Matrix for Inter Luma, InterCb, InterCr

| 16 | 16 | 16 | 16 | 17 | 18 | 20 | 24 |
|----|----|----|----|----|----|----|----|
| 16 | 16 | 16 | 17 | 18 | 20 | 24 | 25 |
| 16 | 16 | 17 | 18 | 20 | 24 | 25 | 28 |
| 16 | 17 | 18 | 20 | 24 | 25 | 28 | 33 |
| 17 | 18 | 20 | 24 | 25 | 28 | 33 | 41 |
| 18 | 20 | 24 | 25 | 28 | 33 | 41 | 54 |
| 20 | 24 | 25 | 28 | 33 | 41 | 54 | 71 |
| 24 | 25 | 28 | 33 | 41 | 54 | 71 | 91 |

Default 8x8 Quant Matrix for Intra Luma, Intra Cb, Intra Cr

| 16 | 16 | 16 | 16 | 17 | 18 | 21 | 24 |
|----|----|----|----|----|----|----|----|
| 16 | 16 | 16 | 16 | 17 | 19 | 22 | 25 |
| 16 | 16 | 17 | 18 | 20 | 22 | 25 | 29 |
| 16 | 16 | 18 | 21 | 24 | 27 | 31 | 36 |
| 17 | 17 | 20 | 24 | 30 | 35 | 41 | 47 |
| 18 | 19 | 22 | 27 | 35 | 44 | 54 | 65 |
| 21 | 22 | 25 | 31 | 41 | 54 | 70 | 88 |
| 24 | 25 | 29 | 36 | 47 | 65 | 88 | 115 |

| 16 | 16 | 16 | 16 | 16 | 16 | 16 | 16 | 17 | 17 | 18 | 18 | 21 | 21 | 24 | 24 |
|---|---|---|---|---|---|---|---|---|---|---|---|---|---|---|---|
| 16 | 16 | 16 | 16 | 16 | 16 | 16 | 16 | 17 | 17 | 18 | 18 | 21 | 21 | 24 | 24 |
| 16 | 16 | 16 | 16 | 16 | 16 | 16 | 16 | 17 | 17 | 19 | 19 | 22 | 22 | 25 | 25 |
| 16 | 16 | 16 | 16 | 16 | 16 | 16 | 16 | 17 | 17 | 19 | 19 | 22 | 22 | 25 | 25 |
| 16 | 16 | 16 | 16 | 17 | 17 | 18 | 18 | 20 | 20 | 22 | 22 | 25 | 25 | 29 | 29 |
| 16 | 16 | 16 | 16 | 17 | 17 | 18 | 18 | 20 | 20 | 22 | 22 | 25 | 25 | 29 | 29 |
| 16 | 16 | 16 | 16 | 18 | 18 | 21 | 21 | 24 | 24 | 27 | 27 | 31 | 31 | 36 | 36 |
| 16 | 16 | 16 | 16 | 18 | 18 | 21 | 21 | 24 | 24 | 27 | 27 | 31 | 31 | 36 | 36 |
| 17 | 17 | 17 | 17 | 20 | 20 | 24 | 24 | 30 | 30 | 35 | 35 | 41 | 41 | 47 | 47 |
| 17 | 17 | 17 | 17 | 20 | 20 | 24 | 24 | 30 | 30 | 35 | 35 | 41 | 41 | 47 | 47 |
| 18 | 18 | 19 | 19 | 22 | 22 | 27 | 27 | 35 | 35 | 44 | 44 | 54 | 54 | 65 | 65 |
| 18 | 18 | 19 | 19 | 22 | 22 | 27 | 27 | 35 | 35 | 44 | 44 | 54 | 54 | 65 | 65 |
| 21 | 21 | 22 | 22 | 25 | 25 | 31 | 31 | 41 | 41 | 54 | 54 | 70 | 70 | 88 | 88 |
| 21 | 21 | 22 | 22 | 25 | 25 | 31 | 31 | 41 | 41 | 54 | 54 | 70 | 70 | 88 | 88 |
| 24 | 24 | 25 | 25 | 29 | 29 | 36 | 36 | 47 | 47 | 65 | 65 | 88 | 88 | 115 | 115 |
| 24 | 24 | 25 | 25 | 29 | 29 | 36 | 36 | 47 | 47 | 65 | 65 | 88 | 88 | 115 | 115 |

*FIG. 4a*

| 16 | 16 | 16 | 16 | 16 | 16 | 16 | 16 | 17 | 17 | 18 | 18 | 21 | 21 | 24 | 24 |
|----|----|----|----|----|----|----|----|----|----|----|----|----|----|----|----|
| 16 | 16 | 16 | 16 | 16 | 16 | 16 | 16 | 17 | 17 | 19 | 19 | 22 | 22 | 25 | 25 |
| 16 | 16 | 16 | 16 | 17 | 17 | 18 | 18 | 20 | 20 | 22 | 22 | 25 | 25 | 29 | 29 |
| 16 | 16 | 16 | 16 | 18 | 18 | 21 | 21 | 24 | 24 | 27 | 27 | 31 | 31 | 36 | 36 |
| 17 | 17 | 17 | 17 | 20 | 20 | 24 | 24 | 30 | 30 | 35 | 35 | 41 | 41 | 47 | 47 |
| 18 | 18 | 19 | 19 | 22 | 22 | 27 | 27 | 35 | 35 | 44 | 44 | 54 | 54 | 65 | 65 |
| 21 | 21 | 22 | 22 | 25 | 25 | 31 | 31 | 41 | 41 | 54 | 54 | 70 | 70 | 88 | 88 |
| 24 | 24 | 25 | 25 | 29 | 29 | 36 | 36 | 47 | 47 | 65 | 65 | 88 | 88 | 115 | 115 |

*FIG. 4b*

SIGNALING OF QUANTIZATION MATRICES

CROSS REFERENCE TO RELATED PATENT APPLICATION(S)

The present disclosure is part of a non-provisional application that claims the priority benefit of U.S. Provisional Patent Applications No. 62/871,124, No. 62/896,642, and No. 62/900,703, filed on 6 Jul. 2019, 6 Sep. 2019, and 16 Sep. 2019, respectively. Contents of above-listed applications are herein incorporated by reference.

TECHNICAL FIELD

The present disclosure relates generally to video coding. In particular, the present disclosure relates to methods of signaling and processing quantization matrices.

BACKGROUND

Unless otherwise indicated herein, approaches described in this section are not prior art to the claims listed below and are not admitted as prior art by inclusion in this section.

The quantization matrix (QM) has been used in various video coding standards. Block-based hybrid video coding schemes which imply transform coding of the residual signal use frequency dependent scaling to control the distribution of the quantization distortion across different frequencies in a transform unit (TU). In order to achieve perceptually uniform quantization across spatial frequencies, a quantization matrix weights each frequency channel associated with the transform coefficient according to the perceived sensitivity over its related frequency range such that lower frequency coefficients in the transform block are quantized in finer quantization step sizes than higher frequency coefficients. At the decoder, a corresponding quantization matrix inversely weighs the de-quantized transform coefficients of each frequency channel. Quantization matrix has been successfully utilized in various video coding standards, such as H.264/AVC (Advanced Video Coding) and H.265/HEVC (High Efficiency Video Coding) and in numerous commercial products, in order to improve the subjective quality of video content.

For H.265/HEVC, depending on the size and type of the transform block, the following quantization matrices are supported. Luma: Intra4×4, Inter4×4, Intra8×8, Inter8×8, Intra16×16, Inter16×16, Intra32×32, Inter32×32. Cb: Intra4×4, Inter4×4, Intra8×8, Inter8×8, Intra16×16, Inter16×16. Cr: Intra4×4, Inter4×4, Intra8×8, Inter8×8, Intra16×16, Inter16×16.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for signaling scaling matrices for transform coefficient quantization. A video decoder receives data from a bitstream to be decoded as a current picture of a video. The video decoder determines a plurality of scaling matrices that are used to code the current picture, wherein a first scaling matrix of the plurality of scaling matrices is determined by referencing a previously determined second scaling matrix of the plurality of scaling matrices. The video decoder dequantizes transform coefficients of transform blocks of the current picture by using the determined plurality of scaling matrices. The video decoder reconstructs the current picture by using the dequantized transform coefficients.

In some embodiments, when a flag in the bitstream (e.g., non_zero_delta_flag) indicates that corresponding elements of the first and second scaling matrices are identical, the first scaling matrix is determined by replicating the elements of the second scaling matrix as the elements of the first scaling matrix; when the flag indicates that corresponding elements of the first and second scaling matrices are not identical, the first scaling matrix is determined by adding a set of delta values to the elements of the second scaling matrix as elements of the first scaling matrix.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 1 illustrates the content of default quantization matrices of sizes 4×4 and 8×8 have default values.

FIGS. 4a-b illustrate 16×16 and 8×16 quantization matrices that are derived from the default 8×8 quantization matrix.

DETAILED DESCRIPTION

Figure 2:
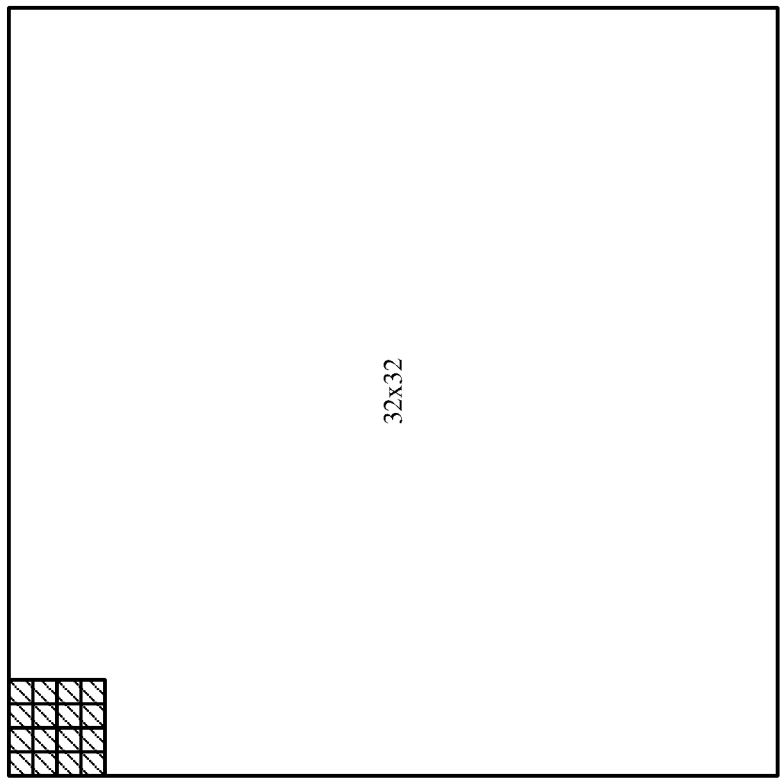
FIG. 2 illustrates up-sampling an 8×8 quantization matrix to derive quantization matrices of larger blocks.
Figure 2:
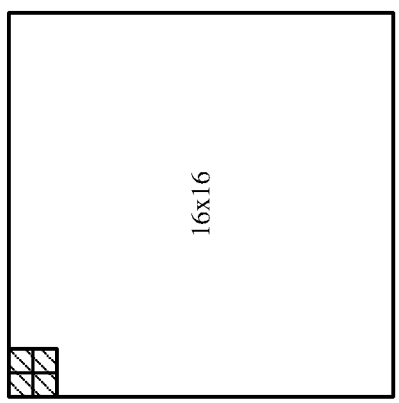
Figure 2:
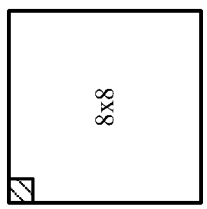
Figure 3A:
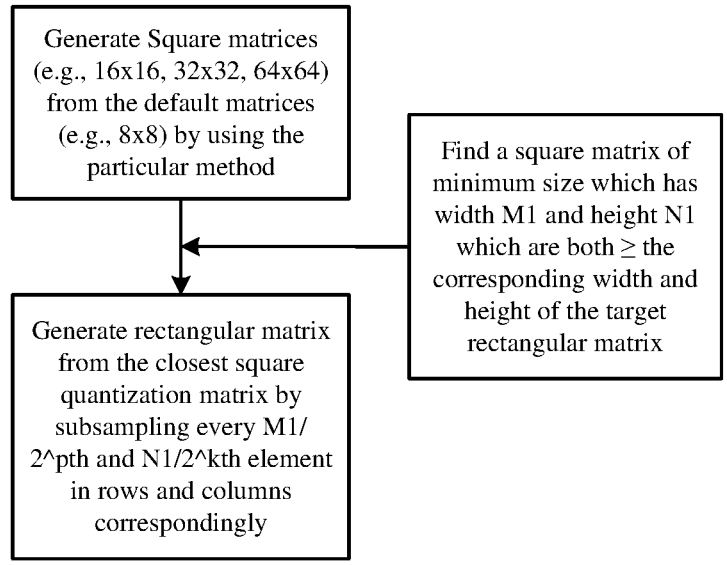
FIGS. 3a-d conceptually illustrate flowcharts for defining matrices for different sizes.
Figure 3B:
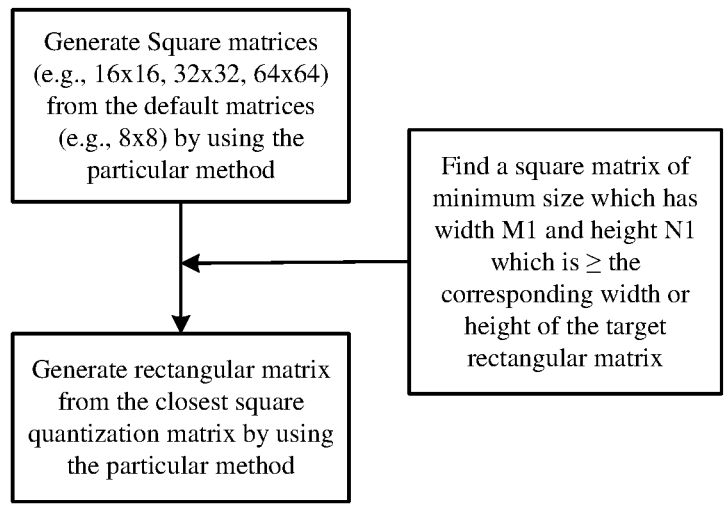
Figure 3C:
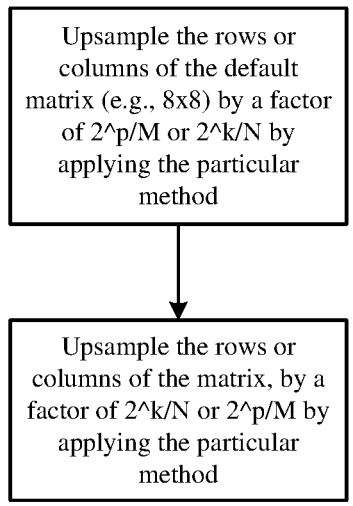
Figure 3D:
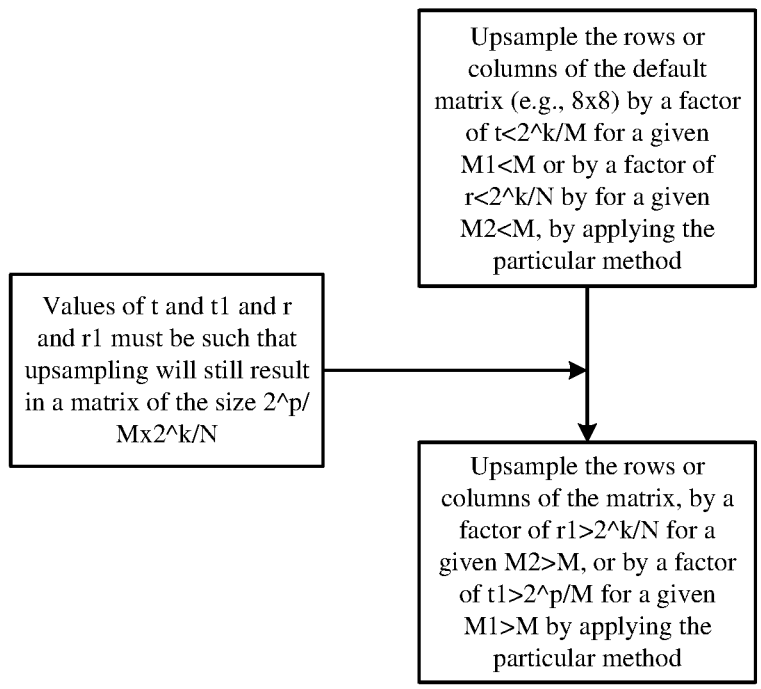

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Adaptive Multiple Core Transform

The HEVC specification includes four integer inverse transform matrices of sizes 4×4, 8×8, 16×16, and 32×32. These transform matrices are integer approximations of the DCT-2 matrix of the same size, aiming at the preservation of the DCT coefficient structure. An additional 4×4 DST matrix is specified which is applied to the residual of intra predicted 4×4 blocks. For distinction from the DST, the four DCTs are referred to as the HEVC core transforms.

In some embodiments, Adaptive Multiple Transform (AMT) scheme is used for residual coding for both inter and intra coded blocks. Multiple selected transforms from the DCT/DST families are applied to the residual blocks, transforms such as DCT-8, DST-1, and DST-7.

The AMT applies to the coding units (CUs) with both width and height smaller than or equal to 64, and whether AMT applies or not is controlled by a CU level flag. When the CU level flag is equal to 0, DCT-2 is applied in the CU to encode the residue. For luma coding block within an AMT enabled CU, two additional flags are signaled to identify the horizontal and vertical transform to be used. The residual of a block can be coded with transform skip mode. In some embodiments, to avoid the redundancy of syntax coding, the transform skip flag is not signaled when the CU level AMT flag is not equal to zero. For intra residue coding, due to the different residual statistics of different intra prediction modes, a mode-dependent transform candidate selection process may be used.

In some embodiments, three transform sets (or subsets) are defined, each transform set includes two or more transform candidates: transform set 0 includes DST-7 and DCT-8, transform set 1 includes DST-7 and DST-1, and transform set 2 includes DST-7 and DCT-8. In some embodiments, transform sets are first identified using the intra prediction mode of a CU with the CU-level AMT flag is equal to 1. For each of the horizontal and vertical transforms, one of the two transform candidates in the identified transform subset, can be selected and explicitly signaled with flags. In some embodiments, for inter prediction residual, only one transform set, which consists of DST-7 and DCT-8, can be used for all inter modes and for both horizontal and vertical transforms. In some embodiments, DCT-8 can be derived from DST-7 with sign changes and reordering before and after the DST-7 computation in order to minimize the usage of additional memory for DCT-8.

II. Quantization Matrices

Some embodiments of the disclosure provide methods for signaling or representing quantization matrices. Quantization matrices are used for achieving frequency dependent scaling. Consequently, quantization matrices may also be referred to scaling matrices, scaling lists, or scaling list matrices. For HEVC, frequency dependent scaling can be enabled by using the syntax element scaling_list_enabled_flag in SPS. When this flag is enabled, additional flags in SPS and PPS control whether the default quantization matrices or non-default quantization matrices are used. For some embodiments, FIG. 1 illustrates the content of default quantization matrices of sizes 4×4 and 8×8 have default values.

In some embodiments, non-default quantization matrices can be optionally transmitted in the bitstream in sequence parameter sets (SPS) or picture parameter sets (PPS).

In order to reduce the memory needed to store the quantization matrices, 8×8 matrices are used to derive quantization matrices of larger transform blocks (e.g., 16×16, 32×32, 64×64, etc.). Thus, the 8×8 default quantization matrices are called base scaling matrices. For example, the quantization matrices for transform blocks of sizes 16×16 and 32×32 are obtained from the 8×8 base scaling matrices of the same type by up-sampling using replication.

FIG. 2 illustrates up-sampling a base scaling matrix (8×8 quantization matrix) to derive quantization matrices of larger blocks. As illustrated, a 1×1 region of an 8×8 quantization matrix is up-sampled into a 2×2 region in a 16×16 quantization matrix and a 4×4 region in a 32×32 quantization matrix.

A. Default Quantization Matrices (Base Scaling Matrices)

In some embodiments, default quantization matrices of size M×N are defined and stored, with a specified coefficient at each position for M×N transform unit (where M and N can be any even number between 2 and 64). In some embodiments, there can be three default quantization/scaling matrices: one of size M=N=4 (for residual blocks of size 4×4, both intra and inter predictions) and two of size M=N=8 (one for intra prediction and another one for inter prediction). In some embodiments, the default quantization/base scaling matrices described by reference to FIG. 1 above is used. In some embodiments, only default quantization matrices for intra prediction are defined (e.g., of sizes 4×4 and 8×8), while quantization matrices for inter prediction can be obtained from the corresponding matrices for intra prediction. In some embodiments, the default quantization matrices of size M×N are not defined (sent) for certain color component of sequences in YUV4:4:4 format. In some embodiments, the 2×2 default scaling matrices are not defined for chroma component of sequences in YUV4:4:4 color format.

In some embodiments, the default M×N quantization matrices are defined and stored, and are used by a video codec (video encoder or decoder) to derive the default $2^p \times 2^k$ quantization matrices for $2^p \times 2^k$ transform units, where p and k can take any value between 1 and 6. In one embodiment, k=p=4, k=p=5 and k=p=6, which correspond to transform units of sizes 16×16, 32×32, and 64×64.

In some embodiments, a video codec generates the quantization matrices for $2^p \times 2^k$ (e.g. 4×4, 4×8, 8×4, 8×8, 4×16, 16×4, 4×32, 32×4, 8×16, 16×8, 16×16, 8×32, 32×8, 16×32, 32×16, 32×32, 16×64, 64×16, 32×64, 64×32, 64×64) transformed block from the default M×N quantization matrices/base scaling matrices, specifically by performing a particular method that includes coefficient mapping and interpolation including simple zero order interpolation which is repetition and linear interpolation based up-sampling. In some embodiments, the video codec upsamples the M×N base scaling matrices in a small interval in low frequency coefficients and upsamples the M×N base scaling matrices in a big interval in high frequency coefficients. FIGS. 3a-d conceptually illustrate flowcharts for defining matrices for size $2^p \times 2^k$. The matrices are defined by using a particular method that includes coefficient mapping and interpolation including simple zero order interpolation which is repetition and linear interpolation based up-sampling.

For example, the 8×8 default quantization matrix/base scaling matrix for IntraLuma, IntraCb, IntraCr as shown in FIG. 1 can be used for obtaining the 16×16 quantization matrix InterLuma, InterCb, InterCr for 16×16 transform units, and for obtaining 8×16 quantization matrix for 8×16 transform blocks. For obtaining the 16×16 quantization matrix, upsampling by 2 may be applied to the 8×8 default quantization matrix in horizontal and vertical directions. For obtaining the 8×16 quantization matrix, upsampling may be applied only to columns. FIGS. 4a-b illustrate 16×16 and 8×16 quantization matrices that are derived from the 8×8 default quantization matrix.

B. Customized Quantization Matrices Representation

In some embodiments, user defined M×N default quantization matrices with a specified coefficient in each position for M×N transform unit is sent or signaled with lossless entropy coding (where M and N can be any even number between 2 and 64). In some embodiments, the user defined default quantization matrices of size M×N are not defined (sent) for a certain color component of sequences in YUV4:4:4 format. In some embodiments, the 2×2 user defined scaling matrices are not defined for chroma component of sequences in YUV4:4:4 color format.

In some embodiments, a user defined smaller size default quantization matrices/base scaling matrices of size M×N (where M and N can be any even number between 2 and 64) is signaled or sent. The smaller size quantization matrices are used to derive the $2^p \times 2^k$ quantization matrices for $2^p \times 2^k$ transform units, where p and k can take any value between 1 and 6.

In some embodiments, a video codec generates the quantization matrix for $2^p \times 2^k$ and p !=k (e.g. 4×8, 8×4, 4×16, 16×4, 4×32, 32×4, 8×16, 16×8, 8×32, 32×8, 16×32, 32×16, 16×64, 64×16, 32×64, 64×32) transformed block from the default M×N quantization matrices, without sending any bits. The quantization matrix is generated by using coefficient mapping and interpolation (e.g., simple zero order interpolation, which is repetition and linear interpolation based up-sampling).

C. Up-Sampling and Down-Sampling Quantization Matrices

In some embodiments, a smaller size M×N quantization matrices for M×N transform units (where M and N can be any even number between 2 and 64) is generated from bigger $2^p \times 2^k$ quantization matrices (where p and k can take any value between 1 and 6). In some embodiments, the DC coefficients are kept and the M×N matrices are sub-sampled in a fixed interval. In some embodiments, the DC coefficients are kept, and the M×N matrices are subsampled in a small interval in low frequency coefficients and sub-sampled in a big interval in high frequency coefficients. In some embodiments, the DC coefficient are kept and the low frequency part (which has the same size of the objected smaller size matrices) of the M×N matrices are also kept.

In some embodiments, larger size $2^p \times 2^k$ quantization matrices (where p and k can take any value between 1 and 6) that correspond to smaller size M×N quantization matrices (where M and N can be any even number between 2 and 64) can be derived. The smaller size M×N quantization matrices may be generated by using sub-sampling methods described in Section II.B above.

In some embodiments, a larger size quantization matrix is generated by up-sampling using fixed interval interpolation and/or repetition. In cases when p≠k, i.e., the transform is non-square, the numbers of interpolated coefficients in horizontal and vertical directions are equal to $(2^p)/M$ and $(2^k)/N$ respectively, where $2^p$ and M ($2^k$ and N)—number of rows (columns) in the target matrices are signaled correspondingly. In some embodiments, the up-sampling is based on using smaller interval interpolation and/or repetition for low frequency coefficients and using bigger interval interpolation and/or repetition for high frequency coefficients. In some embodiments, a smaller size M×N matrix (where M and N can be any even number between 2 and 64) is used as the low frequency part of the larger size $2^p \times 2^k$ quantization matrix (where p and k can take any value between 1 and 6), while the high frequency coefficients of the larger size quantization matrix are generated based on a fixed pattern.

D. Quantization Matrices for Inter and Intra Predictions

In some embodiments, M×N quantization matrices corresponding to M×N transform units (where M and N can be any numbers between 2 and 64) for inter prediction are defined from the corresponding quantization matrices for intra prediction.

In some embodiments, different quantization matrices for inter prediction transform blocks can be obtained depending on the size of the transform unit, i.e. all matrices for inter prediction are defined from the corresponding quantization matrices for intra prediction by applying methods such as linear combination of corresponding coefficients, matrix multiplication, linear/nonlinear regression, etc., to the corresponding elements of the matrices for intra blocks.

In some embodiments, only certain quantization matrices for inter prediction transform blocks are obtained from the corresponding quantization matrices for intra prediction by applying methods such as linear combination of corresponding coefficients, matrix multiplication, linear/nonlinear regression, etc. to the corresponding elements of the matrices for intra blocks. In some embodiments, all rectangular matrices for inter transform blocks may be obtained from the corresponding square quantization matrices for inter transform blocks, by applying methods described in Section II.A above.

E. Quantization Matrices and Transform Types

In some embodiments, different quantization/scaling matrices may be applied depending on the transform type, such that it will be aligned to the energy compaction after the transform. Specifically, different M×N quantization matrices corresponding to M×N transform units (where M and N can be any even numbers between 2 and 64) may be applied when AMT is applied to residual signal, (e.g. depending on different prediction modes).

In some embodiments, different scaling matrices can be defined depending on the prediction mode—inter or intra prediction, independent from the transform types in AMT applied to the residual block. In some embodiments, separate matrices can be obtained for block sizes smaller than K, where K can be any value from 4 to 32. And for all remaining transform block sizes, same quantization matrices used from the transform are applied independently to the residual block. In some embodiments, different scaling matrices are obtained for luma and chroma component, independently from the transform types in AMT applied to the residual block. In some embodiments, transforms considered in AMT are DST-1, DST-7, and DCT-8 and different scaling/quantization matrices can be defined for each transform, including DCT-2, and then applied after horizontal and vertical transformation step separately. In some embodiments, the transforms are DST-1, DST-7, and DCT-8 and different scaling matrices may be computed for all combinations of DCT-2, DST-1, DST-7, and DCT-8 transforms based on the relationships between these transforms.

In some embodiments, only few scaling matrices are defined for the basic set of transforms (e.g. DCT-2, DST-1, DST-7, and DCT-8) and scaling matrices for the result of combination of the basis transforms may be defined by a linear combination of matrix multiplication, permutation, sign changes, flipping, and/or any combination of these basic set of transformations of the basis scaling matrices.

In some embodiments, scaling matrices may be defined and signaled for a subset of the basic transforms, (e.g. a subset that includes only DCT-2, or DCT-2 and DST-7) and scaling matrices for the rest of the transforms (e.g. for DST-7, DST-1, and DCT-8, or for DST-1 and DCT-8) may be defined by a linear combination of matrix multiplication, permutation, sign changes, flipping, and/or any combination of these transformations of the basis scaling matrices. In one example, the derivation process is dependent on the relationship between the defined transform type and the target transform type. In some embodiments, the derivation process is dependent on the relationship between the defined transform coefficients and the target transform coefficients. In some embodiments, scaling matrices may be defined and signaled based on any combination of the above-mentioned methods of scaling matrices derivation.

G. Quantization Matrix for Intra Block Copy Mode

Intra block copy mode, or IBC, is a scheme in which a previously encoded block within the same frame or picture can be used as a predictor for the current block. In some embodiment, intra block copy mode uses the scaling matrices used in inter (prediction) mode. In some embodiments, intra block copy mode uses the scaling matrices used in intra (prediction) mode. In some embodiments, intra block copy mode uses scaling matrices that are different than those used in inter mode and intra mode. In some embodiments, some of the scaling matrices used in intra block copy mode are the same as those used in inter mode, and others are the same as those used in intra mode. The selection of the scaling matrices for intra block copy mode can be implicit selection, (e.g. dependent on the size, quantization parameter, tile group type, and so on), or explicit selection (signaling the selection at sequence level, picture level, tile group level, tile level, block level).

H. Coding Quantization Matrix by Referencing

In some embodiments, multiple options are available for encoding scaling matrices. In some embodiments, elements of scaling matrices can be predicted from elements of smaller scaling matrices. In some embodiments, elements of scaling matrices can be predicted from elements of bigger and/or smaller scaling matrices. In some embodiments, an index of the (e.g., closest) scaling matrix used for prediction, is sent to the decoder together with the difference between the elements of the obtained prediction and elements of the to-be-predicted scaling matrix. In some embodiments, elements of a smaller scaling matrix used for prediction are duplicated/subsampled according to the aspect ratio between the width/height of the scaling matrix used for prediction and width/height of to-be-predicted scaling matrix. In some embodiments, the elements of the last signaled scaling matrix are used for prediction and the difference between the elements of the obtained predicted scaling matrix and elements of the to-be-predicted scaling matrix is sent to the decoder. In some embodiments, the elements of the smaller scaling matrix can be predicted from elements of the bigger scaling matrices with width≤W and/or height≤H. In one embodiment, W=H=32. In one embodiment, W=H=16.

In some embodiments, elements of a M×M smaller scaling matrix can be predicted from elements of the top-left N×N part of a bigger scaling matrix, by duplication/sub-sampling according to the aspect ratio between the size of the M and N, and the difference between the obtained predicted scaling matrix and elements of the to-be-predicted scaling matrix are sent to the decoder. In some embodiments, a portion of the remaining elements of the bigger to-be-predicted scaling matrix are directly sent to the decoder.

In some embodiments, when elements of a smaller scaling matrix is predicted from elements of a bigger scaling matrix, and elements of the bottom right M×N part of the bigger scaling matrix are inferred to be zero and not signaled to the decoder, the prediction is allowed from only non-zeroed out part of the bigger scaling matrix. In one embodiment, the size of the bigger scaling matrix is 64×64, M=N=32. In one embodiment, the size of the bigger scaling matrix is 32×32, M=N=16. In some embodiments, the rest (of the) elements of the smaller scaling matrix, which cannot be predicted due to the zero-out, (since there is no corresponding coefficients signaled in the bigger scaling matrix) are directly signaled to the decoder.

In some embodiments, a current to-be-encoded scaling matrix (or quantization matrix) of size M×M can be predicted only from one of the previously encoded scaling matrices (or quantization matrices) of the same size. In some embodiments, a scaling matrix of size M×M can be predicted from all previously encoded scaling matrices of size N×N that are available for referencing, where N is smaller than or equal to M. In some embodiments, M can be different for one, two or all three color components (e.g., in YUV).

In one embodiment, differential pulse-code modulation (DPCM) coding is available and is used for encoding one or multiple scaling matrices of size M×M. In some embodiments, DPCM coding is used for encoding a first scaling matrix of size M×M (that is coded before other M×M scaling matrices for the current transform block), where M is equal to or a subset of the following set: {4, 8, 16, 32, 64}. In some embodiments, for encoding of every scaling matrix following the first scaling matrix of size M×M, the previously encoded scaling matrices can be used for referencing, and an index is used for indicating or identifying the scaling matrix used for prediction (or predictor scaling matrix) of the current scaling matrix.

Figure 5:
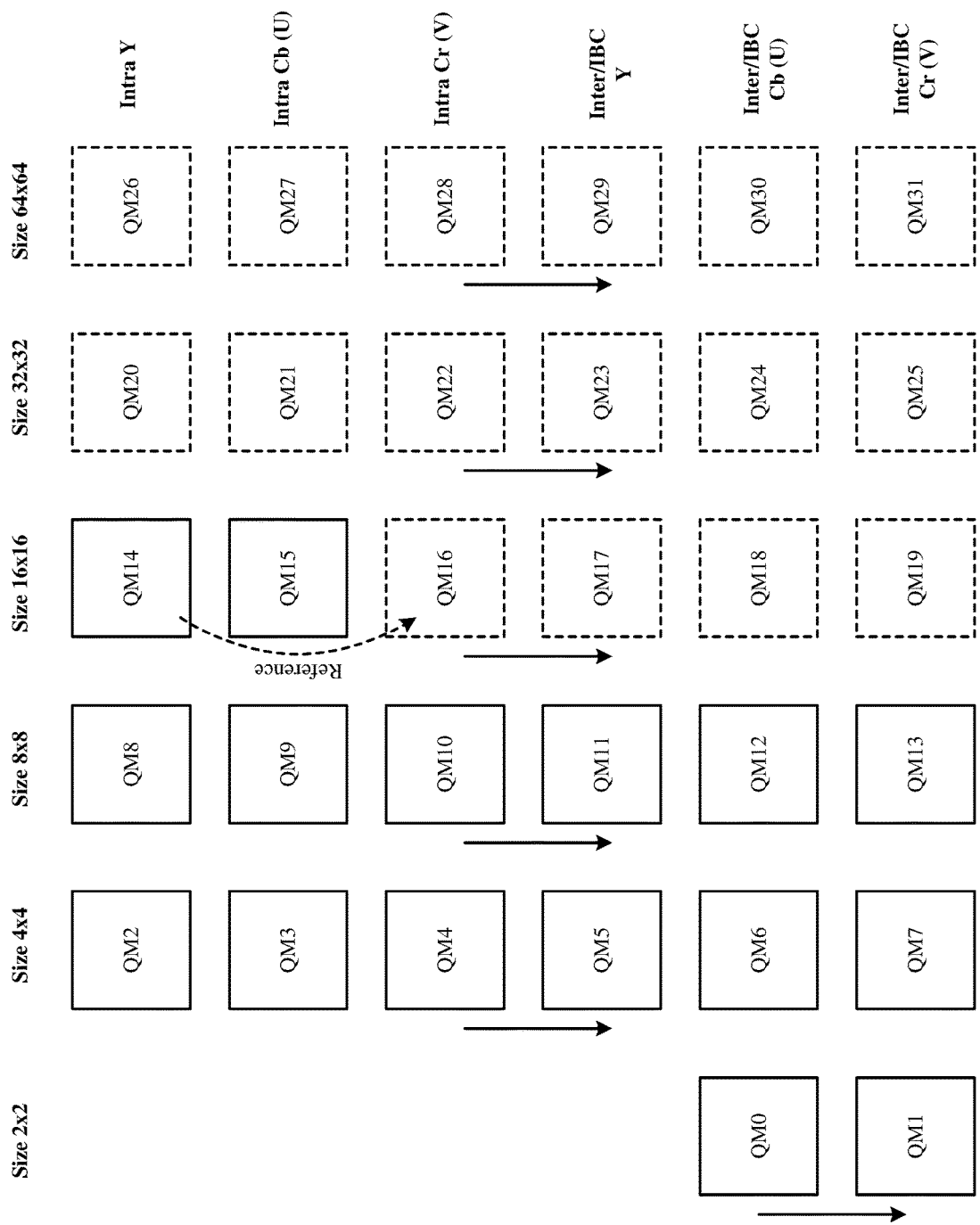
FIG. 5 conceptually illustrates scaling matrices that are determined by referencing previously coded scaling matrices.

FIG. 5 conceptually illustrates scaling matrices (or scaling matrices or quantization matrices) that are determined by referencing previously coded scaling matrices. The figure illustrates example scaling matrices QM0 through QM31 that are to be used for quantizing or dequantizing the transform coefficients of a video picture or a video sequence. The different scaling matrices are designated for transform blocks of different types, e.g., different sizes (2, 4, 8, 16, 32, 64), different color components (YCrCb or YUV), and/or different prediction modes (Inter/Intra).

The scaling matrices QM0 through QM31 are also referred to as basis or base scaling matrices, since they are signaled in a bitstream and serve as basis for deriving the actual quantization matrices used for quantizing or dequantizing a transform block (by e.g., up-sampling or down-sampling).

The figure illustrates the signaling of the basis scaling matrices QM0 through QM31. An encoder signals the scaling matrices QM0 through QM31 by determining each scaling matrix and encoding the determined scaling matrices into the bitstream. The decoder receives the signals for the scaling matrices from the bitstream and reconstructs the scaling matrices by determining the content of each scaling matrix based on the received signaling. In the example, the scaling matrices QM0 through QM15 have already been signaled or determined, while the scaling matrices QM16 through QM31 have yet to be signaled or determined.

The video encoder or decoder may determine the content of a scaling matrix by referencing a previously determined or coded scaling matrix. In the example, the video encoder or decoder determines the content of the scaling matrix QM16 by referencing the content of the scaling matrix QM14. In some embodiments, the scaling matrix QM14 is a perfect predictor of the scaling matrix QM16 so that the video encoder may constructs (or the video decoder may reconstruct) QM16 by copying or replicating the elements of QM14 without applying delta values. If QM14 is not a perfect predictor of QM16, the video encoder may construct (or the video decoder may reconstruct) by adding delta values to the elements of QM14 to form the elements of QM16. In some embodiments, the additional delta values between the reference scaling matrix used for prediction and the scaling matrix to be encoded can be transmitted.

In this example, the referenced scaling matrix QM14 has a same size as the to-be-coded scaling matrix QM16. In some embodiments, when referencing a previously coded scaling matrix for determining a current to-be-coded scaling matrix, the referenced scaling matrix must be the same size as the current scaling matrix. In some embodiments, the referenced scaling matrix may have a different size as the current scaling matrix such that the current scaling matrix is constructed by up-sampling or down-sampling the referenced scaling matrix.

In some embodiments, a flag indicating which coding mode is used for encoding the scaling matrices (DPCM, or reference/prediction plus delta) is signaled to the decoder. In some embodiments, a syntax element non_zero_delta_flag is used to indicate that a perfect prediction was not found for the current scaling matrix and that at least one of the differences between the elements of the predictor scaling matrix and the current scaling matrix to be encoded is not equal to zero and thus deltas are encoded in addition to a reference index that identifies the reference scaling matrix. In some embodiments, DPCM mode is used to code the delta values between the predictor scaling matrix and the current scaling matrix to be encoded for transmission.

In some embodiments, when additional DC value is encoded for a scaling matrix, this DC value is not considered for referencing/prediction and is encoded separately. In some embodiments, the DC value, when present, can be used for referencing/prediction (of DC values of subsequent scaling matrices). In some embodiments, a delta value between the DC value of the referenced predictor scaling matrix and the DC value of the current scaling matrix to be encoded is coded separately and transmitted to the decoder. In some embodiments, when the separate DC value is not present for the referenced predictor scaling matrix, a default DC value is used for as reference for predicting the DC value of the current scaling matrix to be encoded. In some embodiments, the default DC value is equal to 16. In some embodiments, when the separate DC value is not present in the (predictor) scaling matrix used for prediction, the value of the top-left element of the (predictor) scaling matrix used for prediction is used as a predictor for the separate DC value of the (current) scaling matrix being coded. This way, scaling matrices without a separate DC value can still be used for predicting other scaling matrices, even if the current to-be-coded scaling matrix has a separately coded DC value and the referenced predictor scaling matrix does not have the separate DC value.

In some embodiments, the scaling matrices for the different color components (YUV) are encoded separately. In another embodiment, the scaling matrices of the different color components can be encoded together, grouped by the same size in increasing size order.

In some embodiments, the maximum size of the supported scaling matrices depends on the maximum transform block (TB) size. The maximum luma transform block size can be either 64 or 32. In some embodiments, the maximum size of the supported scaling matrices depends on a flag used to indicate the maximum TB size at the SPS level. In some embodiments, the maximum size of the supported scaling matrices is signaled with the scaling matrices in APS. In this case, the maximum size of the supported scaling matrices is the same as the max supported luma TB size in SPS.

Any of the foregoing proposed methods can be implemented in various hardware, software realizations of encoders and/or decoders, or a combination of thereof. For example, an embodiment of the present invention can be one or more circuits integrated into a video compression chip or program code integrated into video compression software to perform the processing described herein. For example, any of the proposed methods can be implemented as a circuit coupled to a quantization module and an inverse quantization module of the encoder, and can be implemented as a circuit coupled to an inverse quantization module of the decoder. In one embodiment, any of the proposed methods can be implemented in a quantization module and an inverse quantization module of an encoder, and can be implemented in an inverse quantization module of a decoder.

III. Syntax Elements

For some embodiments of the disclosure, syntax in SPS (sequence parameter set RBSP syntax), PPS (picture parameter set RBSP syntax), slice, tile, CTU, and CU header are used to signal the quantization matrix to the decoder.

In some embodiments, at a sequence level, a syntax element "seq_quant_matrix_present_flag" is used in SPS to signal whether the sequence will use quantization matrix or not. In some embodiments, if "seq_quant_matrix_present_flag" is true, another syntax element "seq_quant_matrix_present_idx" is checked for each transform size and for each channel (e.g., a color component in YUV) to signal whether the specified transform size and/or channel will use quantization matrix or not.

In some embodiments, if "seq_quant_matrix_present_idx" is true, "use_default_seq_quant_matrix" is checked to signal if the default quantization matrix will be used. In some embodiments, if "use_default_seq_quant_matrix" is signaled, the default quantization matrix will be used. Specifically, the default quantization matrices are read from a hard coded memory, while the remaining square and rectangle quantization matrices, larger quantization matrices and quantization matrices for all cases of AMT are implicitly generated from the default quantization matrices. In some embodiments, if "use_default_seq_quant_matrix" is not true, the sequence level quantization matrices are explicitly generated by coding methods such as the prediction based entropy coding.

In some embodiments, "pic_quant_matrix_present_flag" is used in PPS to signal whether the current picture will use quantization matrix or not. Furthermore, the following syntax can be added either in PPS, or slice, or tile, or CTU, or CU level. In some embodiments, if "pic_quant_matrix_present_flag" is true, "pic_quant_matrix_present_idx" is checked for each prediction mode (inter and intra), transform, transform size and channel (Y,U,V) to signal whether the specified prediction mode, transform, transform size and channel will use quantization matrix or not. In some embodiments, if "pic_quant_matrix_present_idx" is true, "use_seq_quant_matrix_flag" is checked to signal whether the sequence level quantization matrix will be used.

In some embodiments, if "pic_quant_matrix_present_idx" is not true, for example, for certain prediction modes and small transform sizes, the quantization matrices are explicitly generated by coding methods such as the prediction based entropy coding. In some embodiments, for (non-square) rectangular and/or bigger transform sizes, "use_implicit_quant_matrix" is checked. If it is true, the quantization matrix is implicitly generated by techniques described in Section II above. Otherwise, the quantization matrix is explicitly generated by coding methods such as prediction-based entropy coding.

Video encoders follow the foregoing syntax design in order to generate the legal bitstream, and video decoders are able to decode the bitstream correctly only if encoding and decoding processes comply with the foregoing syntax design. When the syntax is skipped in the bitstream, encoders and decoders may set the syntax value as the inferred value to guarantee the encoding and decoding results are matched.

IV. Example Video Encoder

Figure 6:
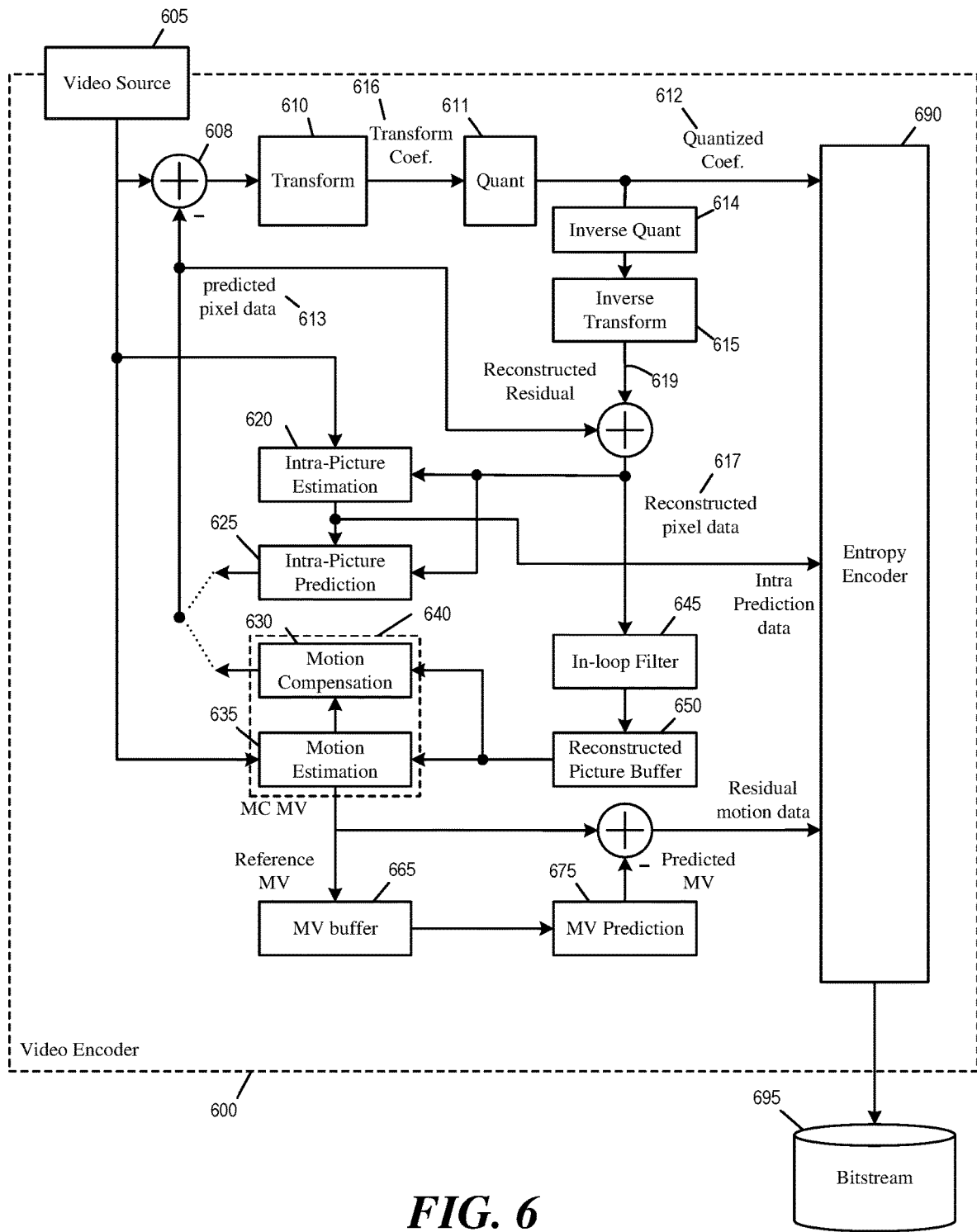
FIG. 6 illustrates an example video encoder.

FIG. 6 illustrates an example video encoder 600. As illustrated, the video encoder 600 receives input video signal from a video source 605 and encodes the signal into bitstream 695. The video encoder 600 has several components or modules for encoding the signal from the video source 605, at least including some components selected from a transform module 610, a quantization module 611, an inverse quantization module 614, an inverse transform module 615, an intra-picture estimation module 620, an intra-prediction module 625, a motion compensation module 630, a motion estimation module 635, an in-loop filter 645, a reconstructed picture buffer 650, a MV buffer 665, and a MV prediction module 675, and an entropy encoder 690. The motion compensation module 630 and the motion estimation module 635 are part of an inter-prediction module 640.

In some embodiments, the modules 610-690 are modules of software instructions being executed by one or more processing units (e.g., a processor) of a computing device or electronic apparatus. In some embodiments, the modules 610-690 are modules of hardware circuits implemented by one or more integrated circuits (ICs) of an electronic apparatus. Though the modules 610-690 are illustrated as being separate modules, some of the modules can be combined into a single module.

The video source 605 provides a raw video signal that presents pixel data of each video frame without compression. A subtractor 608 computes the difference between the raw video pixel data of the video source 605 and the predicted pixel data 613 from the motion compensation module 630 or intra-prediction module 625. The transform module 610 converts the difference (or the residual pixel data or residual signal 609) into transform coefficients (e.g., by performing Discrete Cosine Transform, or DCT). The quantization module 611 quantizes the transform coefficients into quantized data (or quantized coefficients) 612, which is encoded into the bitstream 695 by the entropy encoder 690.

The inverse quantization module 614 de-quantizes the quantized data (or quantized coefficients) 612 to obtain transform coefficients, and the inverse transform module 615 performs inverse transform on the transform coefficients to produce reconstructed residual 619. The reconstructed residual 619 is added with the predicted pixel data 613 to produce reconstructed pixel data 617. In some embodiments, the reconstructed pixel data 617 is temporarily stored in a line buffer (not illustrated) for intra-picture prediction and spatial MV prediction. The reconstructed pixels are filtered by the in-loop filter 645 and stored in the reconstructed picture buffer 650. In some embodiments, the reconstructed picture buffer 650 is a storage external to the video encoder 600. In some embodiments, the reconstructed picture buffer 650 is a storage internal to the video encoder 600.

The intra-picture estimation module 620 performs intra-prediction based on the reconstructed pixel data 617 to produce intra prediction data. The intra-prediction data is provided to the entropy encoder 690 to be encoded into bitstream 695. The intra-prediction data is also used by the intra-prediction module 625 to produce the predicted pixel data 613.

The motion estimation module 635 performs inter-prediction by producing MVs to reference pixel data of previously decoded frames stored in the reconstructed picture buffer 650. These MVs are provided to the motion compensation module 630 to produce predicted pixel data.

Instead of encoding the complete actual MVs in the bitstream, the video encoder 600 uses MV prediction to generate predicted MVs, and the difference between the MVs used for motion compensation and the predicted MVs is encoded as residual motion data and stored in the bitstream 695.

The MV prediction module 675 generates the predicted MVs based on reference MVs that were generated for encoding previously video frames, i.e., the motion compensation MVs that were used to perform motion compensation. The MV prediction module 675 retrieves reference MVs from previous video frames from the MV buffer 665. The video encoder 600 stores the MVs generated for the current video frame in the MV buffer 665 as reference MVs for generating predicted MVs.

The MV prediction module 675 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 695 by the entropy encoder 690.

The entropy encoder 690 encodes various parameters and data into the bitstream 695 by using entropy-coding techniques such as context-adaptive binary arithmetic coding (CABAC) or Huffman encoding. The entropy encoder 690 encodes various header elements, flags, along with the quantized transform coefficients 612, and the residual motion data as syntax elements into the bitstream 695. The bitstream 695 is in turn stored in a storage device or transmitted to a decoder over a communications medium such as a network.

The in-loop filter 645 performs filtering or smoothing operations on the reconstructed pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 7:
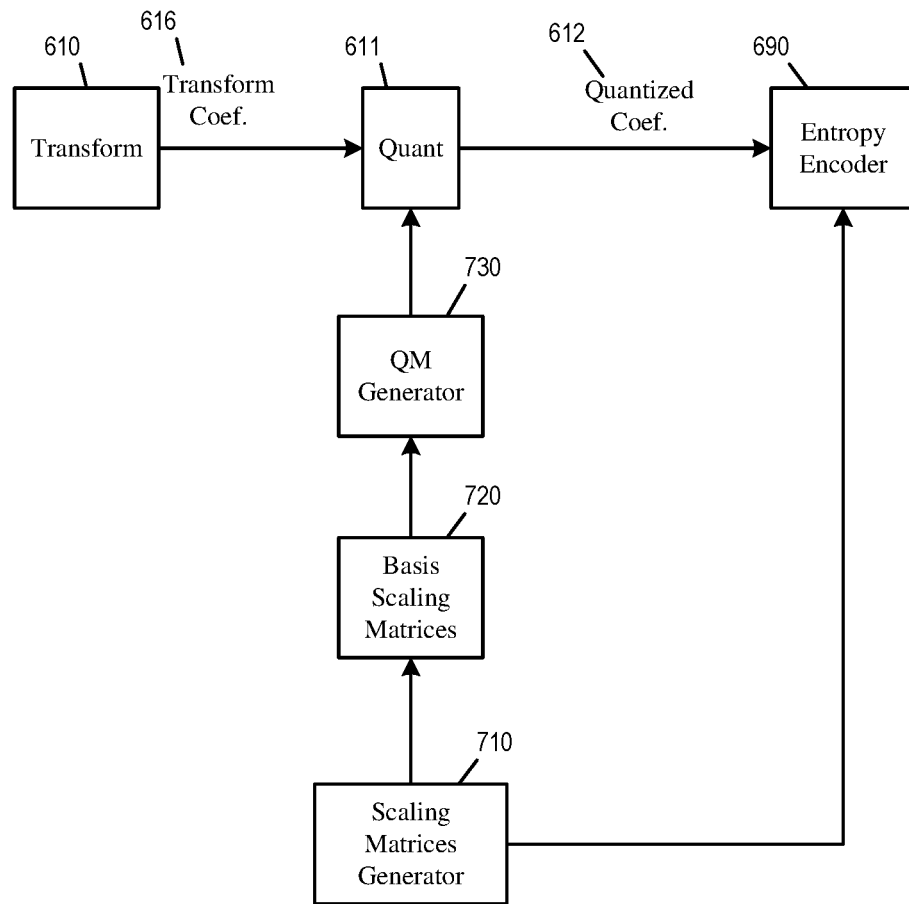
FIG. 7 illustrates portions of the video encoder that implement scaling matrices.

FIG. 7 illustrates portions of the video encoder 600 that implement scaling matrices. As illustrated, the quantization module 611 uses a quantization matrix to quantize transform coefficients 616. The quantization matrix is provided by a quantization matrix generator 730. The quantization matrix generator 730 generates the quantization matrix for the current transform block based on a set of basis scaling matrices 720, by e.g., selecting a basis scaling matrix and performing down-sampling or up-sampling on the selected basis scaling matrix to generate a quantization matrix that matches the size of the current transform block.

The set of basis scaling matrices are determined or constructed by a scaling matrices generator 710 for the current picture or the current sequence of pictures, for transform blocks of different sizes, different color components, and different prediction modes. The scaling matrices generator 710 also provides signals related to the scaling matrices to the entropy encoder 690 to be included in the bitstream 695.

The scaling matrices generator 710 determines the scaling matrices 720. The scaling matrices generator 710 may reference a default scaling matrix when generating the scaling matrices. The scaling matrices generator 710 may also determine the scaling matrices 720 by prediction or copying. Specifically, the scaling matrices generator may determine a scaling matrix by referencing a previously determined scaling matrix (e.g., QM16 references QM14 of FIG. 5). To signal or encode a scaling matrix, the scaling matrices generator 710 may signal the content of the scaling matrix directly by e.g., using DPCM to the entropy encoder 690. The scaling matrices generator 790 may also provide to the entropy encoder 690, an identifier of a predictor scaling matrix being referenced, delta values between the predictor scaling matrix and the current scaling matrix being coded, and a flag (e.g., non_zero_delta_flag) indicating whether the predictor scaling matrix is a perfect predictor.

Figure 8:
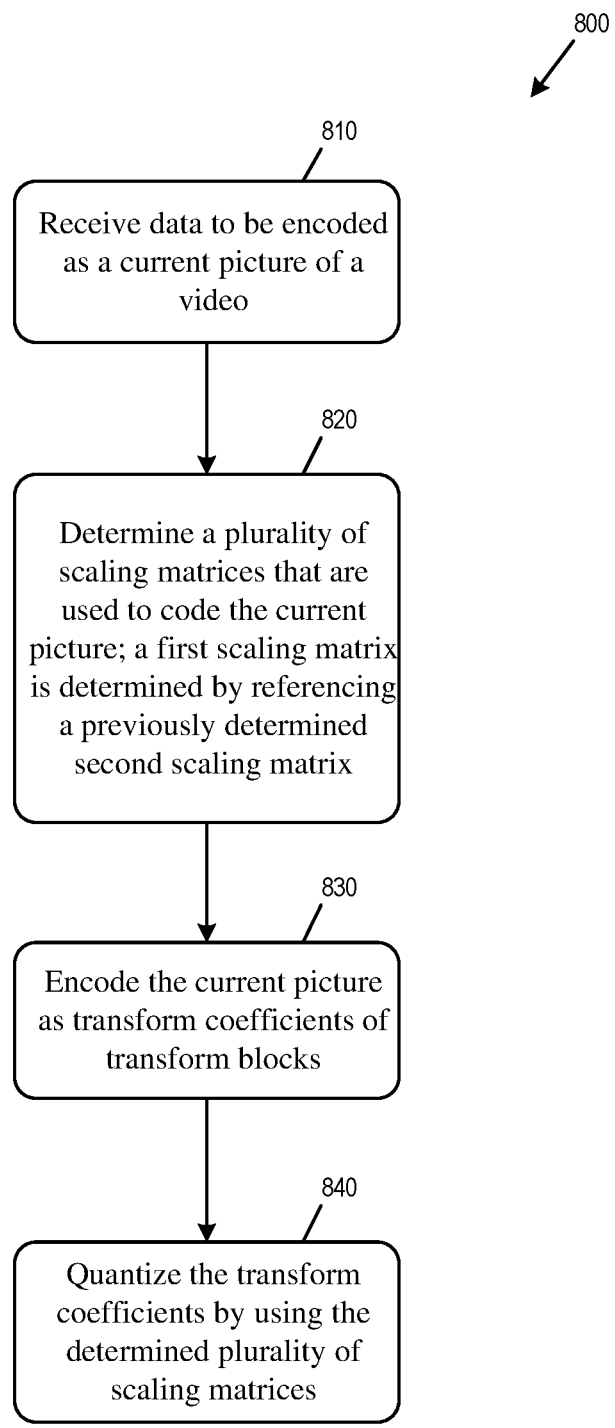
FIG. 8 conceptually illustrates a process that determines scaling matrices by referencing previously determined scaling matrices for encoding a video picture.

FIG. 8 conceptually illustrates a process 800 that determines scaling matrices by referencing previously determined scaling matrices for encoding a video picture. In some embodiments, one or more processing units (e.g., a processor) of a computing device implements the encoder 600 performs the process 800 by executing instructions stored in a computer readable medium. In some embodiments, an electronic apparatus implementing the decoder 600 performs the process 800.

The encoder receives (at block 810) data to be encoded as a current picture of a video. The encoder determines (at block 820) a plurality of scaling matrices that are used to code the current picture. A first scaling matrix of the plurality of scaling matrices is determined by referencing a previously determined second scaling matrix of the plurality of scaling matrices. In some embodiments, when the encoder signals a flag in the bitstream (e.g., non_zero_delta_flag) to indicate that corresponding elements of the first and second scaling matrices are identical, the first scaling matrix is determined by replicating the elements of the second scaling matrix as the elements of the first scaling matrix; when the flag indicates that corresponding elements of the first and second scaling matrices are not identical, the first scaling matrix is determined by adding a set of delta values to the elements of the second scaling matrix as elements of the first scaling matrix. In some embodiment, the set of delta values may be encoded by using differential pulse-code modulation (DPCM).

In some embodiments, the second scaling matrix is identified by an identifier that is stored in a picture parameter set (PPS) of the current picture or a sequence parameter set (SPS) of a sequence of video pictures that includes the current picture. The first scaling matrix and the second scaling matrix may have identical widths and heights. In some embodiments, the first scaling matrix and the second scaling matrix may have different widths and heights. In some embodiments, the first scaling matrix may be determined by up-sampling elements of a smaller scaling matrix as described in Section II above. In some embodiments, a top-left most element of the second scaling matrix is used as a DC value of the first scaling matrix. In some embodiments, a DC value of the first scaling matrix may be determined by applying a delta value to a DC value of the second scaling matrix.

The encoder encodes (at block 830) the current picture as transform coefficients of transform blocks. The encoder quantizes (at block 840) the transform coefficients by using the plurality of scaling matrices (basis scaling matrices). For example, when encoding a transform block, the encoder may select a scaling matrix from the plurality of scaling matrices and performing down-sampling or up-sampling to generate a quantization matrix that matches the size, color component, and prediction type of the transform block.

V. Example Video Decoder

Figure 9:
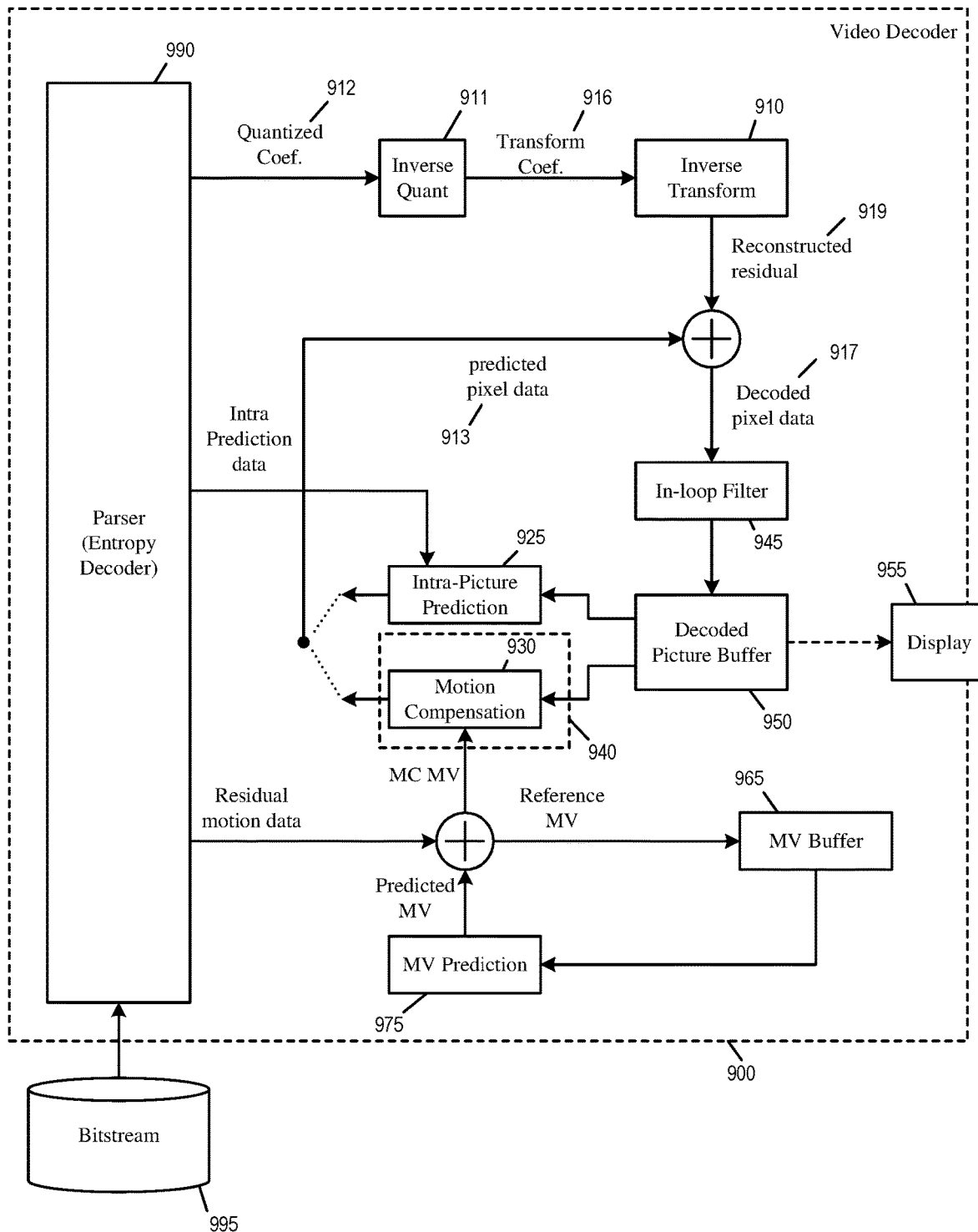
FIG. 9 illustrates an example video decoder.

FIG. 9 illustrates an example video decoder 900. As illustrated, the video decoder 900 is an image-decoding or video-decoding circuit that receives a bitstream 995 and decodes the content of the bitstream into pixel data of video frames for display. The video decoder 900 has several components or modules for decoding the bitstream 995, including some components selected from an inverse quantization module 911, an inverse transform module 910, an intra-prediction module 925, a motion compensation module 930, an in-loop filter 945, a decoded picture buffer 950, a MV buffer 965, a MV prediction module 975, and a parser 990. The motion compensation module 930 is part of an inter-prediction module 940.

In some embodiments, the modules 910-990 are modules of software instructions being executed by one or more processing units (e.g., a processor) of a computing device. In some embodiments, the modules 910-990 are modules of hardware circuits implemented by one or more ICs of an electronic apparatus. Though the modules 910-990 are illustrated as being separate modules, some of the modules can be combined into a single module.

The parser 990 (or entropy decoder) receives the bitstream 995 and performs initial parsing according to the syntax defined by a video-coding or image-coding standard. The parsed syntax element includes various header elements, flags, as well as quantized data (or quantized coefficients) 912. The parser 990 parses out the various syntax elements by using entropy-coding techniques such as context-adaptive binary arithmetic coding (CABAC) or Huffman encoding.

The inverse quantization module 911 de-quantizes the quantized data (or quantized coefficients) 912 to obtain transform coefficients, and the inverse transform module 910 performs inverse transform on the transform coefficients 916 to produce reconstructed residual signal 919. The reconstructed residual signal 919 is added with predicted pixel data 913 from the intra-prediction module 925 or the motion compensation module 930 to produce decoded pixel data 917. The decoded pixels data are filtered by the in-loop filter 945 and stored in the decoded picture buffer 950. In some embodiments, the decoded picture buffer 950 is a storage external to the video decoder 900. In some embodiments, the decoded picture buffer 950 is a storage internal to the video decoder 900.

The intra-prediction module 925 receives intra-prediction data from bitstream 995 and according to which, produces the predicted pixel data 913 from the decoded pixel data 917 stored in the decoded picture buffer 950. In some embodiments, the decoded pixel data 917 is also stored in a line buffer (not illustrated) for intra-picture prediction and spatial MV prediction.

In some embodiments, the content of the decoded picture buffer 950 is used for display. A display device 955 either retrieves the content of the decoded picture buffer 950 for display directly, or retrieves the content of the decoded picture buffer to a display buffer. In some embodiments, the display device receives pixel values from the decoded picture buffer 950 through a pixel transport.

The motion compensation module 930 produces predicted pixel data 913 from the decoded pixel data 917 stored in the decoded picture buffer 950 according to motion compensation MVs (MC MVs). These motion compensation MVs are decoded by adding the residual motion data received from the bitstream 995 with predicted MVs received from the MV prediction module 975.

The MV prediction module 975 generates the predicted MVs based on reference MVs that were generated for decoding previous video frames, e.g., the motion compensation MVs that were used to perform motion compensation. The MV prediction module 975 retrieves the reference MVs of previous video frames from the MV buffer 965. The video decoder 900 stores the motion compensation MVs generated for decoding the current video frame in the MV buffer 965 as reference MVs for producing predicted MVs.

The in-loop filter 945 performs filtering or smoothing operations on the decoded pixel data 917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 10:
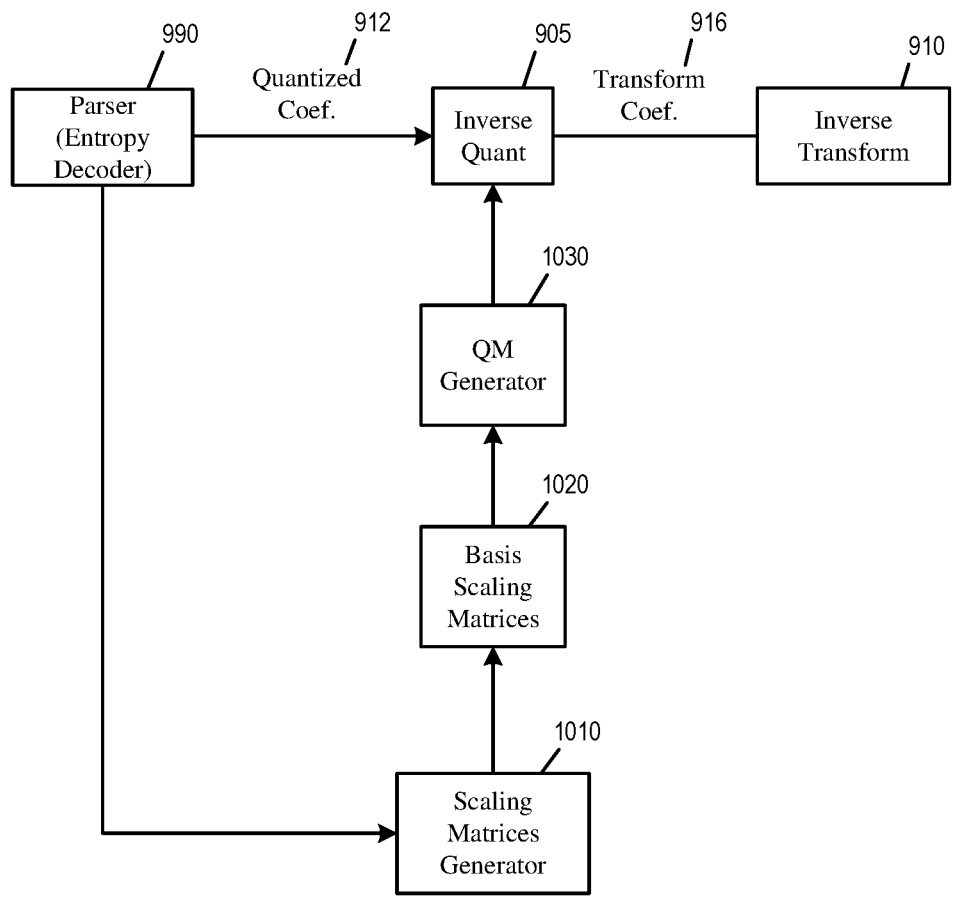
FIG. 10 illustrates portions of the video decoder that implement scaling matrices.

FIG. 10 illustrates portions of the video decoder 900 that implement scaling matrices. As illustrated, the de-quantization module 911 uses a quantization matrix to dequantize transform coefficients 916. The quantization matrix is provided by a quantization matrix generator 1030. The quantization matrix generator 1030 generates the quantization matrix for the current transform block based on a set of basis scaling matrices 1020, by e.g., selecting a basis scaling matrix and performing down-sampling or up-sampling on the selected basis scaling matrix to generate a quantization matrix that matches the size of current transform block.

The set of basis scaling matrices are determined or constructed by a scaling matrices generator 1010 for the current picture or the current sequence of pictures, for transform blocks of different sizes, different color components, and different prediction modes. The scaling matrices generator 1010 receives signals related to the scaling matrices parsed by the entropy decoder 990 from the bitstream 995.

The scaling matrices generator 1010 determines the scaling matrices 1020. The scaling matrices generator 1010 may reference a default scaling matrix when generating the scaling matrices. The scaling matrices generator 1010 may also determine the scaling matrices 1020 by prediction or copying. Specifically, the scaling matrices generator may determine a scaling matrix by referencing a previously determined scaling matrix (e.g., QM16 references QM14 of FIG. 5). To reconstruct or decode a scaling matrix, the scaling matrices generator 1010 may receive signals related to the content of the scaling matrix directly from the entropy decoder 990 by e.g., using DPCM. The scaling matrices generator 1090 may also receive from the entropy decoder 990, an identifier of a predictor scaling matrix being referenced, delta values between the predictor scaling matrix and the current scaling matrix being coded, and a flag (e.g., non_zero_delta_flag) indicating whether the predictor scaling matrix is a perfect predictor.

Figure 11:
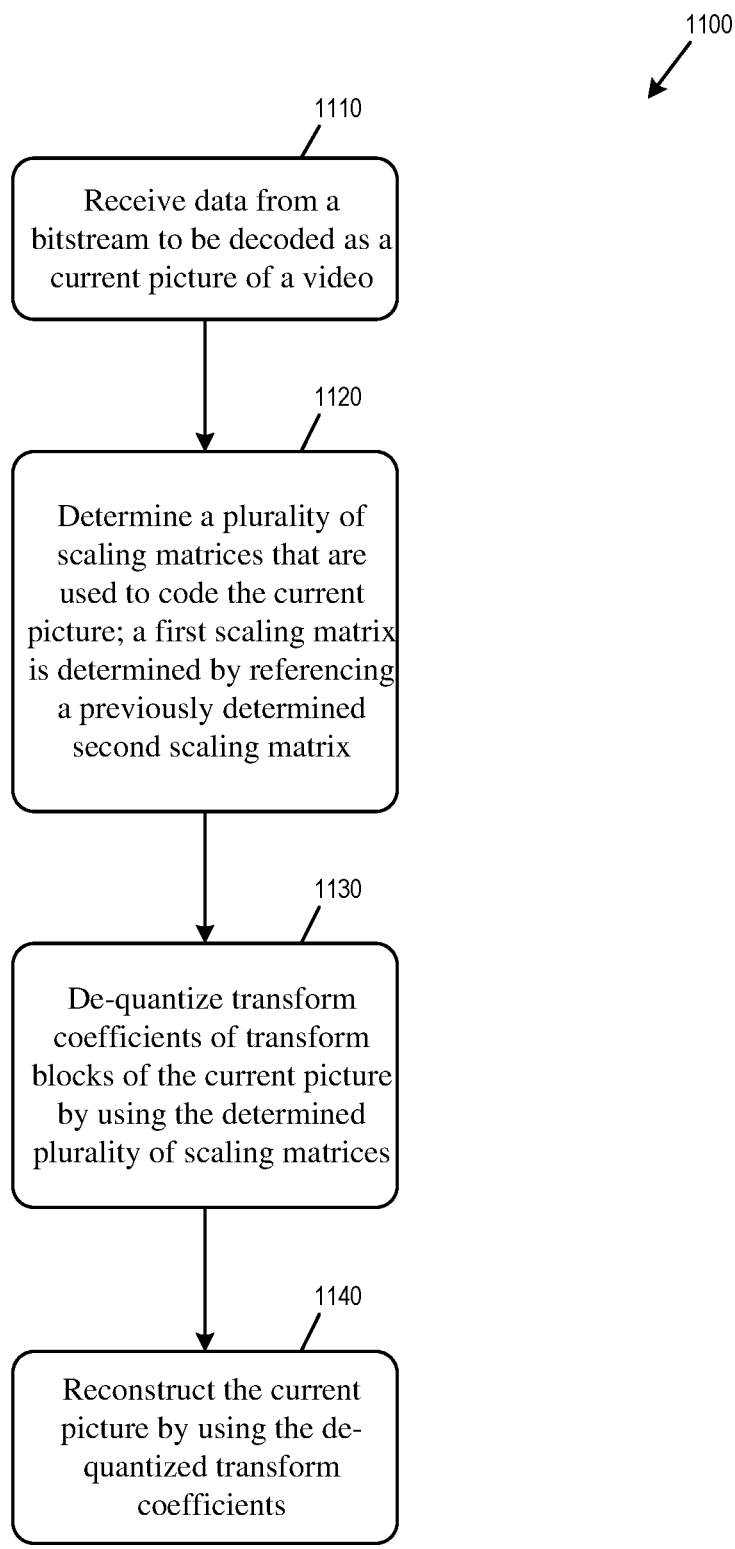
FIG. 11 conceptually illustrates a process that reconstructs scaling matrices by referencing previously reconstructed scaling matrices for decoding a video picture.

FIG. 11 conceptually illustrates a process 1100 that reconstructs scaling matrices by referencing previously reconstructed scaling matrices for decoding a video picture. In some embodiments, one or more processing units (e.g., a processor) of a computing device implements the decoder 900 performs the process 1100 by executing instructions stored in a computer readable medium. In some embodiments, an electronic apparatus implementing the decoder 900 performs the process 1100.

The decoder receives (at block 1110) data from a bitstream to be decoded as a current picture of a video. The decoder determines (at block 1120) a plurality of scaling matrices that are used to code the current picture. A first scaling matrix of the plurality of scaling matrices is determined by referencing a previously determined or decoded second scaling matrix of the plurality of scaling matrices. In some embodiments, when the decoder receives a flag in the bitstream (e.g., non_zero_delta_flag) to indicate that corresponding elements of the first and second scaling matrices are identical, the first scaling matrix is determined by replicating the elements of the second scaling matrix as the elements of the first scaling matrix; when the flag indicates that corresponding elements of the first and second scaling matrices are not identical, the first scaling matrix is determined by adding a set of delta values to the elements of the second scaling matrix as elements of the first scaling matrix. In some embodiment, the set of delta values may be encoded by using differential pulse-code modulation (DPCM).

In some embodiments, the second scaling matrix is identified by an identifier that is stored in a picture parameter set (PPS) of the current picture or a sequence parameter set (SPS) of a sequence of video pictures that includes the current picture. The first scaling matrix and the second scaling matrix may have identical widths and heights. In some embodiments, the first scaling matrix and the second scaling matrix may have different widths and heights. In some embodiments, determining the first scaling matrix may involve up-sampling elements of a smaller matrix as described in Section II above. In some embodiments, a top-left most element of the second scaling matrix is used as a DC value of the first scaling matrix. In some embodiments, a DC value of the first scaling matrix may be determined by applying a delta value to a DC value of the second scaling matrix.

In some embodiments, when a flag in the bitstream (e.g., non_zero_delta_flag) indicates that corresponding elements of the first and second scaling matrices are identical, the first scaling matrix is determined by replicating the elements of the second scaling matrix as the elements of the first scaling matrix; when the flag indicates that corresponding elements of the first and second scaling matrices are not identical, the first scaling matrix is determined by adding a set of delta values to the elements of the second scaling matrix as elements of the first scaling matrix. In some embodiments, the set of delta values are coded by using differential pulse-code modulation (DPCM).

In some embodiments, the flag for indicating whether corresponding elements of the first and second scaling matrices are identical is stored in a picture parameter set (PPS) of the current picture or a sequence parameter set (SPS) of a sequence of video pictures that includes the current picture.

The decoder dequantizes (at block 1130) transform coefficients of transform blocks of the current picture by using the determined plurality of scaling matrices (basis scaling matrices). For example, when decoding a transform block, the decoder may select a scaling matrix from the plurality of scaling matrices and performing down-sampling or up-sampling to generate a quantization matrix that matches the size, color component, and prediction type of the transform block. The decoder reconstructs (at block 1140) the current picture by using the dequantized transform coefficients.

VI. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 12:
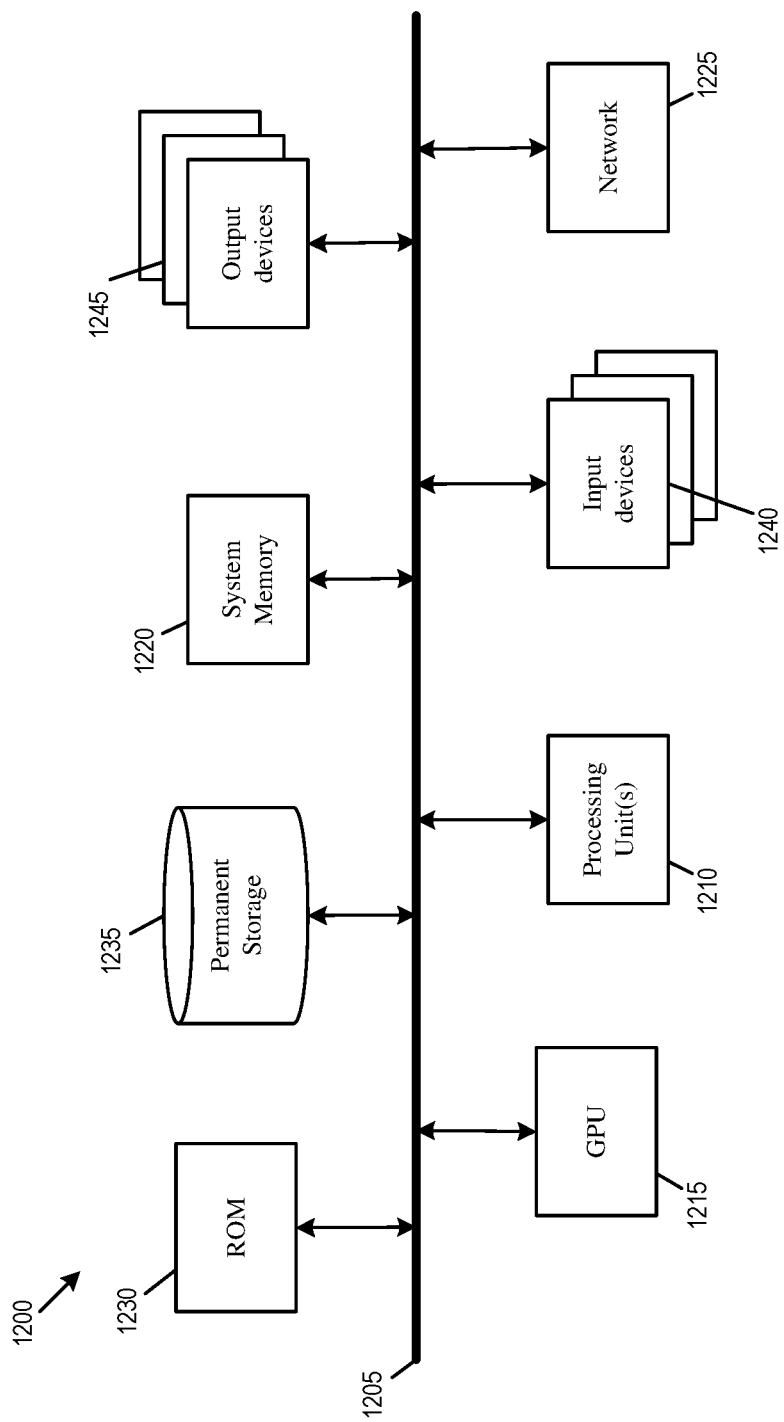
FIG. 12 conceptually illustrates an electronic system with which some embodiments of the present disclosure are implemented.

FIG. 12 conceptually illustrates an electronic system 1200 with which some embodiments of the present disclosure are implemented. The electronic system 1200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1200 includes a bus 1205, processing unit(s) 1210, a graphics-processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the GPU 1215, the read-only memory 1230, the system memory 1220, and the permanent storage device 1235.

From these various memory units, the processing unit(s) 1210 retrieves instructions to execute and data to process in order to execute the processes of the present disclosure. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are used by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the present disclosure use a mass-storage device (such as a magnetic or optical disk and its corresponding disk drive) as the permanent storage device 1235.

Other embodiments use a removable storage device (such as a floppy disk, flash memory device, etc., and its corresponding disk drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor uses at runtime. In some embodiments, processes in accordance with the present disclosure are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alpha-numeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 8 and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
receiving data from a bitstream to be decoded as a current picture of a video;
determining a plurality of scaling matrices that are used to code the current picture, wherein a first scaling matrix of the plurality of scaling matrices is determined by referencing a previously determined second scaling matrix of the plurality of scaling matrices;
dequantizing transform coefficients of transform blocks of the current picture by using the determined plurality of scaling matrices; and
reconstructing the current picture by using the dequantized transform coefficients;
wherein when a flag in the bitstream indicates that corresponding elements of the first and second scaling matrices are not identical, the first scaling matrix is determined by adding a set of delta values to the elements of the second scaling matrix as elements of the first scaling matrix.

2. The method of claim 1, wherein the first scaling matrix has a width or a height that is smaller than that of the second scaling matrix, and wherein the elements of the second scaling matrix to which the set of delta values are added comprise down-sampled elements of the second scaling matrix.

3. The method of claim 1, wherein the set of delta values are encoded by using differential pulse-code modulation (DPCM).

4. The method of claim 1, wherein the first scaling matrix and the second scaling matrix have identical widths and heights.

5. The method of claim 1, wherein the first scaling matrix and the second scaling matrix have different widths and heights.

6. The method of claim 1, wherein determining the first scaling matrix comprises up-sampling elements of a smaller matrix.

7. The method of claim 1, wherein a top-left most element of the second scaling matrix is used as a DC value of the first scaling matrix.

8. The method of claim 1, wherein a DC value of the first scaling matrix is determined by applying a delta value to a DC value of the second scaling matrix.

9. An electronic apparatus, comprising:
a video decoder circuit configured to perform operations comprising:
receiving data from a bitstream to be decoded as a current picture of a video;
determining a plurality of scaling matrices that are used to code the current picture, wherein a first scaling matrix of the plurality of scaling matrices is determined by referencing a previously determined second scaling matrix of the plurality of scaling matrices;
dequantizing transform coefficients of transform blocks of the current picture by using the determined plurality of scaling matrices; and
reconstructing the current picture by using the dequantized transform coefficients,
wherein when a flag in the bitstream indicates that corresponding elements of the first and second scaling matrices are not identical, the first scaling matrix is determined by adding a set of delta values to the elements of the second scaling matrix as elements of the first scaling matrix.

10. A video encoding method, comprising:
receiving data to be encoded as a current picture of a video;
determining a plurality of scaling matrices that are used to code the current picture, wherein a first scaling matrix of the plurality of scaling matrices is determined by referencing a previously determined second scaling matrix of the plurality of scaling matrices;
encoding the current picture as transform coefficients of transform blocks; and
quantizing the transform coefficients by using the determined plurality of scaling matrices;
wherein when a flag in the bitstream indicates that corresponding elements of the first and second scaling matrices are not identical, the first scaling matrix is determined by adding a set of delta values to the elements of the second scaling matrix as elements of the first scaling matrix.

* * * * *